Aug. 31, 1937.  E. MEIER  2,091,871
METHOD OF WELDING ALLOYS TO A BASE METAL
Filed Dec. 8, 1936
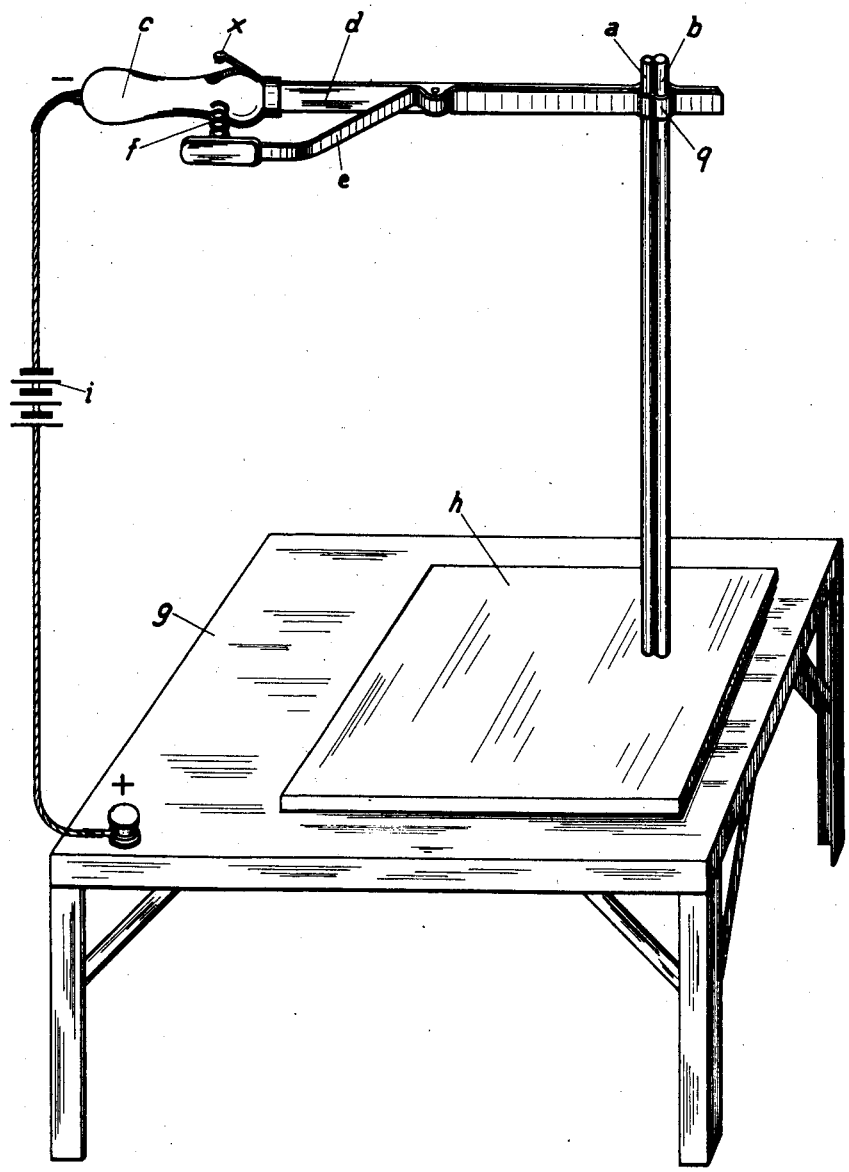
INVENTOR
ERNST MEIER
ATTORNEY

UNITED STATES PATENT OFFICE 2,091,871

METHOD OF WELDING ALLOYS TO A BASE METAL

Ernst Meier, Brunswick-Melverode, Germany, assignor to Braunschweiger Huttenwerk G. m. b. H., Brunswick-Melverode, Germany Application December 8, 1936, Serial No. 114,856
In Germany November 11, 1935

1 Claim. (Cl. 219—10)

My invention relates to improvements in the method of welding alloys to a base metal, and the object of the improvements is to provide a method which is simple in operation and which may be carried out at low cost. With this object in view my invention consists in simultaneously melting metals from which the alloy is to be composed, heating a base metal to which the alloy is to be applied, and allowing the molten metals to flow on the base metal to be coated thereby. In the preferred method the base metal is heated so far, that it is likewise partly molten.

For the purpose of explaining the invention a tool suitable for putting the method into effect has been illustrated in the accompanying drawing, the said drawing showing an elevation of the said tool.

As shown in the said drawing the tool comprises a pair of tongs comprising pivotally connected arms $d$ and $e$ which are normally held in work clamping position by a spring $f$, and which are constructed at their ends with outwardly bulged portions $q$ in which the rods $a$ and $b$ may be clamped. The arm $d$ carries a handle $c$.

The said handle is used in connection with a suitable support $g$ for a metallic blank $h$ to which the alloy is to be applied, and with a source of heat such as an electric battery $i$ connected with its positive terminal to the said support $g$ and with its negative terminal to the tongs $d$, $e$, the support $g$ being made from conductive material.

In carrying out the method the rods $a$ and $b$ of the metal to be alloyed and to be applied to the base metal $h$, for example rods of iron and copper, are clamped one beside the other between the arms $d$ and $e$, and they are held with their free ends near the base metal $h$. Now the ends of the said rods and the base metal $h$ are heated, for example by means of the arc discharge between the same, so far that the rods $a$ and $b$ are simultaneously molten at their ends, and preferably also the base metal is molten at its surface. The molten metal dripping from the ends of the rods $a$ and $b$ combines into an alloy and it drops on the base metal $h$ where it is also combined with the molten portions of the said base metal. I have found that by this method a uniform coating of alloy is applied to the base metal, and that the said alloy is rigidly combined with the base metal.

The cross-sections of the rods $a$ and $b$ may be alike, but they may also be different and in proportions corresponding to the desired proportions of the metals in the alloy to be produced. In determining the cross-sections of the rods $a$ and $b$ consideration should be paid to the fact that also a part of the surface of the base metal forms one of the components of the alloy.

While in describing the invention reference has been made to a particular example embodying the same I wish to be understood that I do not limit myself to the details described herein, and that various changes may be made in the method and in the construction of the tools and other appliances used in the method. For example, in lieu of an electric arc other heating means may be used, such for example as a blow-pipe flame.

I claim:

A method of welding alloys of selectively variable composition upon a metal base comprising the steps of selecting a plurality of metallic rods from a group of rods at least some of which differ chemically and in cross sectional area from others of said rods, supporting the selected rods independently of each other, each with an end adjacent to the corresponding ends of the others and close to a surface of said metal base, connecting said rods and said base in an electric circuit, and establishing a difference of potential between said rods and said base so as to cause molten metal from each of said rods to flow on said surface.

ERNST MEIER.